United States Patent
Kenney et al.

(10) Patent No.: US 10,902,545 B2
(45) Date of Patent: Jan. 26, 2021

(54) GPU TASK SCHEDULING

(71) Applicant: Apple Inc., Cupertino, CA (US)

(72) Inventors: Robert D. Kenney, Austin, TX (US); Benjiman L. Goodman, Cedar Park, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 14/574,041

(22) Filed: Dec. 17, 2014

(65) Prior Publication Data

US 2016/0055610 A1 Feb. 25, 2016

Related U.S. Application Data

(60) Provisional application No. 62/039,251, filed on Aug. 19, 2014.

(51) Int. Cl.
*G06T 1/20* (2006.01)
*G09G 5/00* (2006.01)
*G06F 3/14* (2006.01)
*G09G 5/36* (2006.01)

(52) U.S. Cl.
CPC .................. *G06T 1/20* (2013.01); *G06F 3/14* (2013.01); *G09G 5/001* (2013.01); *G09G 5/363* (2013.01)

(58) Field of Classification Search
CPC ....................................................... G06T 1/20
USPC ....................................................... 345/522
See application file for complete search history.

(56) References Cited

U.S. PATENT DOCUMENTS

| | | | | |
|---|---|---|---|---|
| 6,584,587 | B1* | 6/2003 | McDermott | G06F 3/14 714/23 |
| 7,119,809 | B1* | 10/2006 | McCabe | G06T 11/40 345/422 |
| 2003/0037091 | A1* | 2/2003 | Nishimura | G06F 9/4881 718/103 |
| 2005/0134588 | A1* | 6/2005 | Aila | G06T 15/60 345/426 |
| 2006/0271717 | A1* | 11/2006 | Koduri | G06F 9/52 710/241 |
| 2009/0027418 | A1* | 1/2009 | Maru | G06F 17/30241 345/629 |
| 2010/0122067 | A1* | 5/2010 | Lindholm | G06F 9/3851 712/205 |

(Continued)

*Primary Examiner* — Hai Tao Sun
(74) *Attorney, Agent, or Firm* — Kowert, Hood, Munyon, Rankin & Goetzel, P.C.

(57) ABSTRACT

Techniques are disclosed relating to scheduling tasks for graphics processing. In one embodiment, a graphics unit is configured to render a frame of graphics data using a plurality of pass groups and the frame of graphics data includes a plurality of frame portions. In this embodiment, the graphics unit includes scheduling circuitry configured to receive a plurality of tasks, maintain pass group information for each of the plurality of tasks, and maintain relative age information for the plurality of frame portions. In this embodiment, the scheduling circuitry is configured to select a task for execution based on the pass group information and the age information. In some embodiments, the scheduling circuitry is configured to select tasks from an oldest frame portion and current pass group before selecting other tasks. This scheduling approach may result in efficient execution of various different types of graphics workloads.

19 Claims, 5 Drawing Sheets

(56) References Cited

U.S. PATENT DOCUMENTS

| | | | | |
|---|---|---|---|---|
| 2010/0123717 A1* | 5/2010 | Jiao | ............... | G06T 15/005 |
| | | | | 345/426 |
| 2011/0080416 A1* | 4/2011 | Duluk, Jr. | ............. | G06T 1/20 |
| | | | | 345/506 |
| 2012/0194526 A1* | 8/2012 | Sander | ............... | G06T 1/20 |
| | | | | 345/503 |
| 2012/0315014 A1* | 12/2012 | Shuster | ........... | G06F 17/30817 |
| | | | | 386/241 |
| 2014/0259016 A1* | 9/2014 | Lottes | ............. | G06F 9/4881 |
| | | | | 718/102 |

* cited by examiner

GPU TASK SCHEDULING

This application claims the benefit of U.S. Provisional Application No. 62/039,251, filed on Aug. 19, 2014, which is incorporated by reference herein in its entirety.

BACKGROUND

Technical Field

This disclosure relates generally to computer processing and more specifically to GPU scheduling.

Description of the Related Art

Graphics processing units (GPUs) typically operate on large amounts of graphics data in parallel using multiple execution pipelines or shaders. Task scheduling is often an important aspect of shader performance. The order in which tasks are scheduled can significantly affect the efficiency of important hardware resources such as execution slots, caches, individual shaders, etc. Different processing workloads may benefit from different scheduling approaches. However, complex scheduling circuitry may consume considerable area and power. This may be problematic in mobile graphics applications where a battery is a power source.

SUMMARY

Techniques are disclosed relating to scheduling tasks for graphics processing. In one embodiment, a graphics unit is configured to render a frame of graphics data using a plurality of pass groups and the frame of graphics data includes a plurality of frame portions. In this embodiment, the graphics unit includes scheduling circuitry configured to receive a plurality of tasks, maintain pass group information for each of the plurality of tasks, and maintain relative age information for the plurality of frame portions. In this embodiment, the scheduling circuitry is configured to select a task for execution based on the pass group information and the age information. This scheduling approach may result in efficient execution of various different types of graphics workloads in various embodiments.

In some embodiments, scheduling circuitry is configured to schedule tasks for an oldest frame portion and current pass group before scheduling other tasks. In one embodiment, tasks are scheduled according to the following priority order: tasks associated with an oldest frame portion and current pass group, tasks associated with a second oldest frame portion and current pass group, tasks associated with an oldest frame portion and any pass group, and tasks associated with a second oldest frame portion and any pass group. In one embodiment, tasks are scheduled using a round-robin among the frame portions if no task is found using this priority order.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1A:
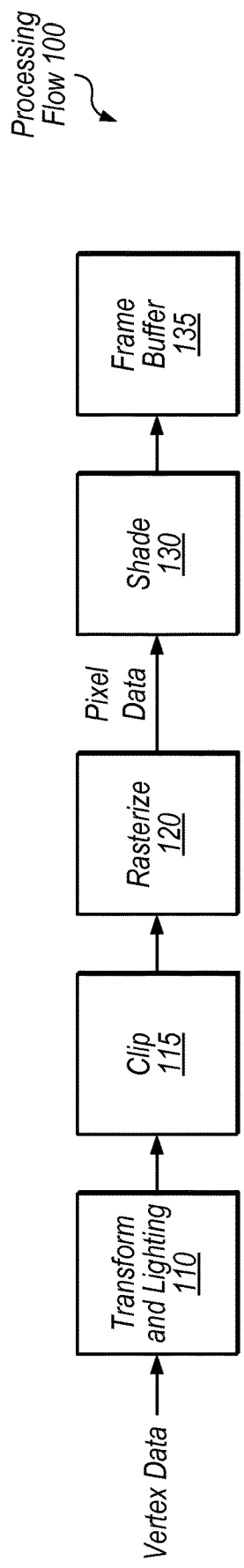
FIG. 1A is a block diagram illustrating an exemplary graphics processing flow.
Figure 1B:
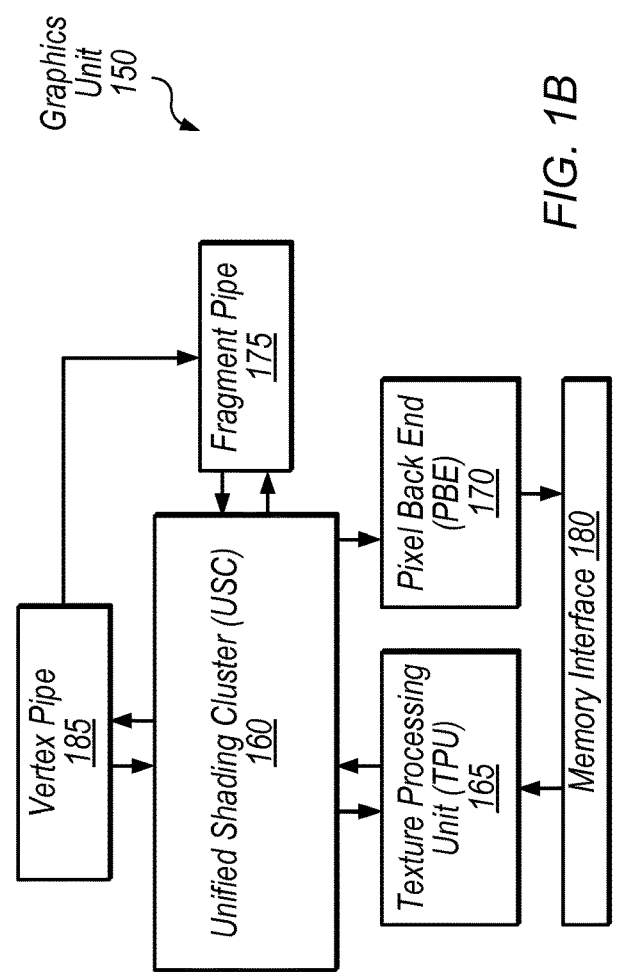
FIG. 1B is a block diagram illustrating one embodiment of a graphics unit.

This disclosure initially describes, with reference to FIGS. 1A-B, an overview of a graphics processing flow and an exemplary graphics unit. Embodiments of scheduling circuitry are described in further detail with reference to FIGS. 2-4 and an exemplary device is described with reference to FIG. 5. In some embodiments, the disclosed task scheduling techniques may accommodate various different graphics processing workloads without requiring complex hardware.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution pipelines for processing data in parallel. USC 160 may be referred to as "unified" in the illustrated embodiment in the sense that it is configured to process both vertex and fragment data. In other embodiments, programmable shaders may be configured to process only vertex data or only fragment data.

A "task" refers to a set of operations to be performed for 1 to N execution instances, where N is an integer representing the maximum task size for a given embodiment. USC 160, in some embodiments, is configured to perform single instruction multiple data (SIMD) operations for vertex, pixel, and compute programs provided by a user. In these embodiments, USC 160 is configured to receive tasks that include from 1 to N SIMD instances and execute the same program (or set of instructions) for the 1 to N instances. N, in some embodiments, is the width of the SIMD implementation, e.g., the number of ALUs available for parallel operations. The type of instance may be based on the type of program. For example, a vertex task may run the same program on 1 to N vertices while a pixel task may run the same program on 1 to N pixels. In these embodiments, USC 160 is configured to execute a given task's program correctly, which may include managing dependencies between instructions within a task as well as managing any resources allocated to each task. In these embodiments, USC 160 includes resources for each task such as instruction dependency logic and an instruction address pointer. In one embodiment, USC 160 is configured to manage multiple tasks concurrently and maintain unique resources for each task, while execution pipelines may be shared by various in-flight tasks.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed portions of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Task Scheduling and Workload Overview

GPU 150, in various embodiments, is configured to store and process portions of a graphics frame separately. For example, in one embodiment, USC 160 is configured as a tile-based renderer. As used herein, a "tile" refers to a rectangular or square portion of a frame that includes multiple pixels. In other embodiments, GPU 150 may separately operate on "frame portions," which, as used herein, refers to groups of pixels in a frame that may exhibit various shapes or geometries. Accordingly, a tile is one example of a frame portion. Various tile-based embodiments and techniques are disclosed herein, but any of these embodiments and/or techniques may be implemented using any appropriate types of frame portions.

Tile-based rendering may allow efficient use of processing resources, but also results in having many tasks available for execution. Tiles may vary in size in various embodiments, from a few pixels to larger areas of a frame. When processing of each tile is complete, the tiles may be combined to make up the frame for further processing and/or display.

GPU 150, in various embodiments, is configured to perform graphics operations for a frame of graphics data in a specified order. Various graphics programming languages allow a programmer to specify an order in which operations should be performed during rendering of a frame. For example, different blend operations may be performed on a group of pixels in an order specified by a graphics program. Pixel resources are associated with a pixel being rendered and are typically defined by a graphics API to guarantee that accesses appear to occur atomically in API-submission order. In some embodiments, pixel resources for a given pixel are only accessible to fragments covering that pixel. Examples of pixel resources may include output color buffers, a depth buffer, and a stencil buffer. In other embodiments, an API may define any of various sets of pixel resources.

To facilitate the program-specified ordering while allowing parallel processing, access to various pixel resources may be serialized by organizing fragment operations into pass groups. A "pass group" refers to a set of operations for a non-overlapping group of fragments upon which the set of operations can be executed in an arbitrary order, with respect to each other, without affecting output results. Thus, access to pixel resources may be serialized through a sequence of pass groups such that the accesses appear to occur atomically in API submission order. Fragments assigned to a given pass group in the sequence should not update pixel resources until operations for prior pass groups have finished. For example, if two or more pass groups are to be performed for a frame of graphics data, operations for the second pass group may be performed in any order among the second pass group, but should not be performed until the first pass group has finished. In some embodiments, a given pass of a multi-pass rending (e.g., a shadow pass or a reflection pass) may utilize multiple pass groups to maintain API submission order within the rendering pass while allowing parallel processing of fragments for the pass.

Different types of workloads performed by a GPU typically benefit from different scheduling approaches. For example, blending operations are often performed in layers using different pass groups such that a later blend operation for a pixel must wait for results of a previous blend operation. These types of operations may benefit from a round-robin scheduling algorithm, for example, among tiles. In this type of round-robin, a task is typically sent from each available tile before another task is sent from a tile. For example, for three tiles, round-robin arbitration sends tasks from tiles in the following order: task 1, task 2, task 3, task 1, task 2, task 3, task 1, and so on. This distributed approach may result in efficient hardware utilization because work for pixels from a given tile is more likely to be finished before dependent work from that tile is scheduled (e.g., because work from other tiles will be performed in between, due to the round-robin approach).

However, a round-robin scheduler may be relatively disadvantageous for many texture processing operations. These texture operations are performed by TPU 165, in one embodiment, which may include one or more caches for storing texture data. Operations for different tiles typically access different areas of texture memory. Thus, sending tasks in an interleaved manner from multiple different tiles may greatly reduce texture cache performance (e.g., texture data may be over-fetched, and poor cache hit rates may result from poor spatial locality). These problems may be further exacerbated by proprietary memory formats often used to store textures and other image data. Texture processing may therefore benefit from an age-based scheduling algorithm. An exemplary age-based algorithm may include sending texture requests or samples in the order they are received within a tile and sending requests from the same tile in succession. However, this may result in inefficient use of hardware resources for other workloads (e.g., for blend operations as discussed above). For example, if operations for multiple pass groups within a single tile are scheduled in close proximity according to the age-based approach, pipeline stalls will likely occur while dependencies are resolved.

Therefore, techniques are disclosed in which task management or scheduling circuitry is configured to consider both relative ages of tiles corresponding to tasks and pass groups corresponding to tasks, according to some embodiments.

Exemplary Task Manager

Figure 2:
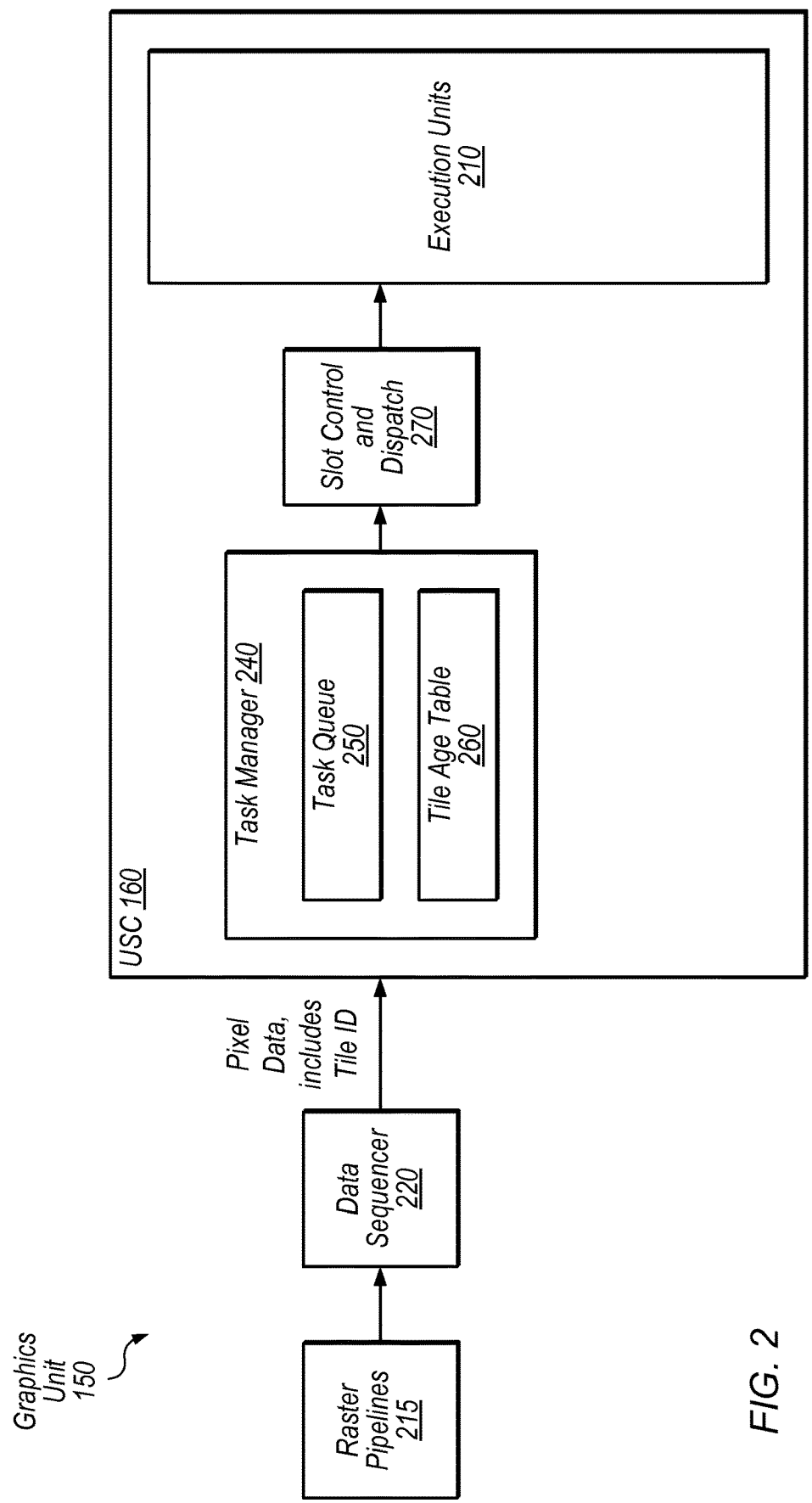
FIG. 2 is a block diagram illustrating one embodiment of a graphics unit that includes a task manager.

Referring now to FIG. 2, a block diagram illustrating one embodiment of a graphics unit 150 that includes a task manager 240 is shown. In this embodiment, graphics unit 150 includes one or more raster pipelines 215, data sequencer 220, and USC 160. In the illustrated embodiment, USC 160 includes task manager 240, slot control and dispatch unit 270, and execution units 210.

Raster pipelines 215, in the illustrated embodiment, are configured to perform rasterization operations and generate pixel data for further processing. Graphics unit 150 may include various numbers of raster pipelines 215 in different embodiments. In one embodiment, each raster pipeline 215 is configured to process data for a particular tile.

Data sequencer 220, in the illustrated embodiment, is configured to send work to USC 160 for processing. In this embodiment, data sequencer 220 is configured to organize graphics data into tasks. Blend operations and texture sample operations are examples of operations that may be included in such tasks. Data sequencer 220 may be configured to determine groups of pixels for which the same operations are to be performed and group those pixels into tasks for parallel execution. In some embodiments, each task includes operations for pixels within a single tile.

In the illustrated embodiment, the pixel data sent to USC 160 from data sequencer 220 includes an identification of the Tile ID of each task and/or pixel. USC 160, in the illustrated embodiment, is configured to perform each task in parallel using execution units 210. In the illustrated embodiment, USC 160 utilizes a SIMD architecture in which a given graphics instruction is performed in parallel using multiple lanes served by execution units 210. Typically, for fragment or pixel processing, each execution unit 210 is configured to perform a given operation for one pixel. Typically, in the illustrated embodiment, a task is assigned to a slot by slot control and dispatch unit 270. In this embodiment, each slot is able to utilize the width of the SIMD architecture. For example, in an embodiment that includes eight execution units 210, a task may be formed with operations for eight pixels and assigned to a slot for execution. In some embodiments, different slots may be allowed to use processing resources in an interleaved manner to avoid pipeline stalls. USC 160 may include any of various appropriate numbers of execution lanes such as 16, 32, 64, 256, etc.

Task manager 240, in some embodiments, is configured to schedule tasks based on both the ages of tiles and the pass groups associated with tasks. This may result in improved texture cache performance while efficiently utilizing execution resources for other workloads, in some embodiments. In some embodiments, task manager 240 is implemented using relatively lower power circuitry, in comparison to circuitry for more complex scheduling algorithms. In the illustrated embodiment, task manager 240 is configured to store task information using task queue 250. In the illustrated embodiment, task manager 240 is configured to maintain the relative ages among tiles being processed using tile age table 260. In some embodiments, task manager 240 is configured to preferentially select tasks from a current pass group and older tiles. For example, FIG. 3 discussed in detail below shows one embodiment of such a method for task selection.

Tile age table 260, in one embodiment, is configured to store tile identifiers in the order in which tasks for tiles are received. In this embodiment, when a task is received for a tile that is not already represented in tile age table 260, that tile is added to the table and indicated as currently being the youngest tile. In this embodiment, entries in tile age table 260 are de-allocated and the table is collapsed appropriately when processing for a given tile is finished (e.g., based on an indication from control circuitry in USC 160). In this embodiment, the first tile received by tile age table 260 that has not been de-allocated is the "oldest" tile among the tiles of a given frame. In some embodiments, tile age table 260 is configured to maintain a list in which the head is the oldest tile and the tail is the youngest tile among tiles of a given frame. Thus, in some embodiments, the relative age of a frame portion or tile is determined by an age of a first task received for that frame portion or tile. For example, consider the following sequence of tasks received by task manager 240:

Task 1; Tile B
Task 2; Tile A
Task 3; Tile B
Task 4; Tile C

In this embodiment, tile age table 260 would contain the entries B, A, C, with tile B at the head of the table indicated as the oldest relative tile among tiles A, B, and C. In other embodiments, other techniques may be used to maintain relative ages of tiles. For example, timestamps may be used to mark when a first task for a given tile is received. The implementation of tile age table 260 is provided for illustrative purposes but is not intended to limit techniques used to determine relative tile age.

Figure 3:
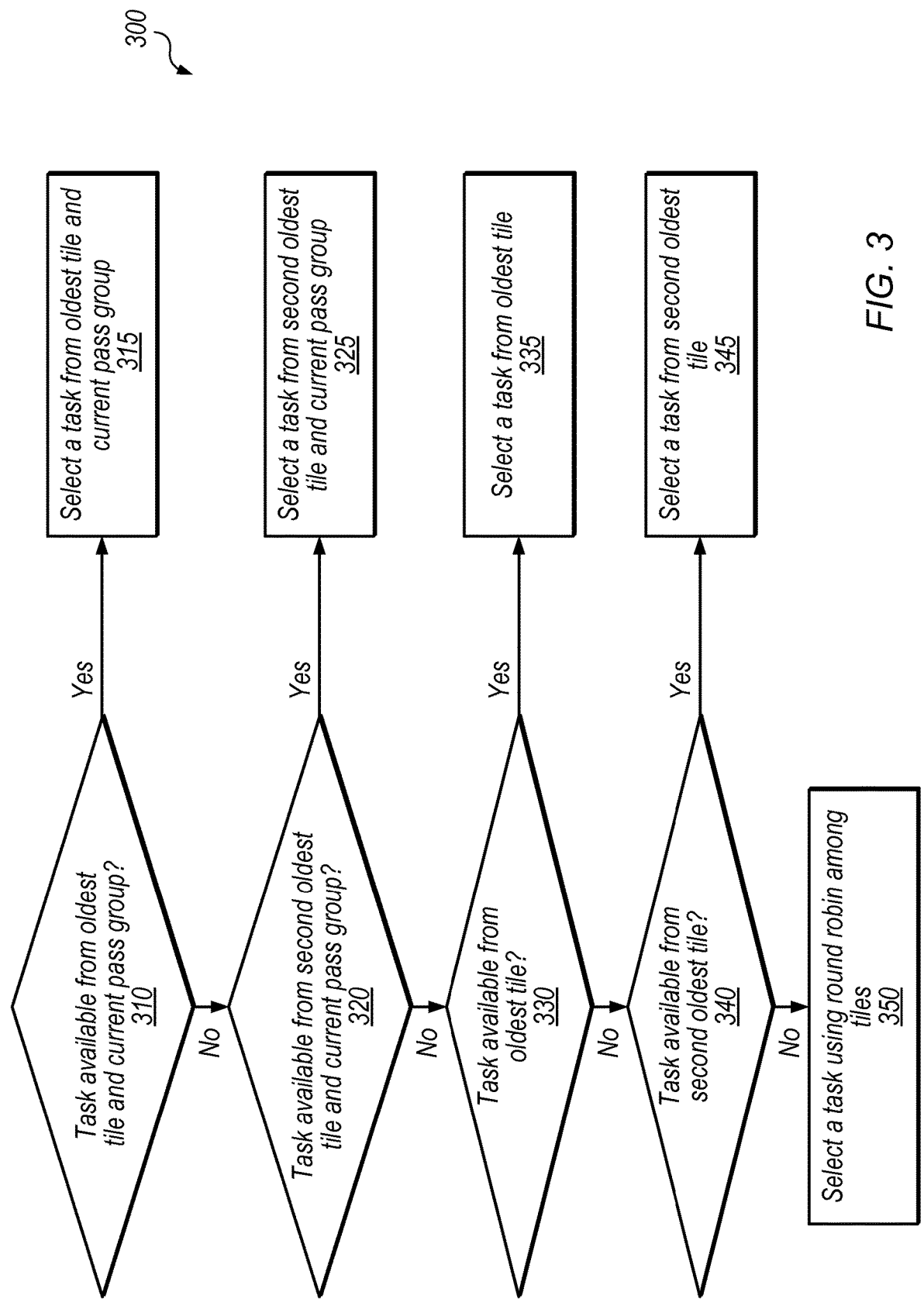
FIG. 3 is a block diagram illustrating one embodiment of a method for task selection.

Referring now to FIG. 3, a flow diagram illustrating one exemplary embodiment of a method 300 for task selection is shown. Flow begins at block 310.

At block 310, task manager 240 determines whether a task is available and ready to execute from the oldest tile and current pass group. For example, in this embodiment, if tile age table 260 indicates tile B as the oldest tile and USC 160 is currently processing pass group 6, tasks from tile B and pass group 6 would meet the criteria of block 310. If such a task or tasks are available, one or more of them are selected for execution at block 315. Thus, in this embodiment, all available tasks from an oldest tile and the current pass group are scheduled before other tasks are scheduled, absent an exception or intervening scheduling process. This may greatly improve cache locality in this embodiment by sending work from the same tile in succession. This may also allow efficient execution for blending operations because tasks from another tile are selected when a new pass group is encountered. If a task is not available from an oldest tile and current pass group, flow proceeds to block 320.

At block 320, task manager 240 determines whether a ready task is available from the second oldest tile and current pass group. If such a task or tasks are available, one or more of them are selected for execution at block 325. If not, flow proceeds to block 330.

At block 330, task manager 240 determines whether a ready task is available from the oldest tile and any pass group. If such a task or tasks are available, one or more of them are selected for execution at block 335. If not, flow proceeds to block 340.

At block 340, task manager 240 determines whether a ready task is available from the second oldest tile and any pass group. If such a task or tasks are available, one or more of them are selected for execution at block 345. If not, flow proceeds to block 350.

At block 350, task manager selects a task using round-robin arbitration among tiles. Flow ends at block 350. Flow may begin again at block 310 when task manager 240 is ready to select another task for execution.

In one embodiment, task manager is configured to implement the method of FIG. 3 within three cycles. Because a given tile can either match or not match a current pass group, there are only three potential scenarios, each of which can be resolved in this embodiment in at most three cycles (with round-robin being the default selection on the third cycle if the other priority order fails to find a task that is ready). In some embodiments, the approach of FIG. 3 improves cache performance for texture processing workloads while also allowing efficient hardware utilization and performance for workloads that benefit from a more distributed approach. For example, the method of FIG. 3 may often result in a bias towards sending tasks from the same (e.g., the oldest) tile until another pass group is encountered. At that point, another tile may receive highest priority in this embodiment until all available operations for the pass group are complete.

In various embodiments, other techniques may be used to select tasks based on tile age and pass group in addition to and/or in place of the approach of FIG. 3. For example, greater or smaller numbers of tiles may be considered based on age in other embodiments. In these embodiments, scheduling circuitry may be configured to consider only tasks from the oldest past group before moving to round-robin (e.g., omitting decision blocks 320 and 340) or configured to consider tasks from third or fourth oldest tiles, etc. (which would result in additional decision blocks). In other embodiments, decision blocks 330 and 340 may be omitted. In various embodiments, other approaches may be used in addition to and/or in place of round-robin techniques as a fall-through algorithm.

Figure 4:
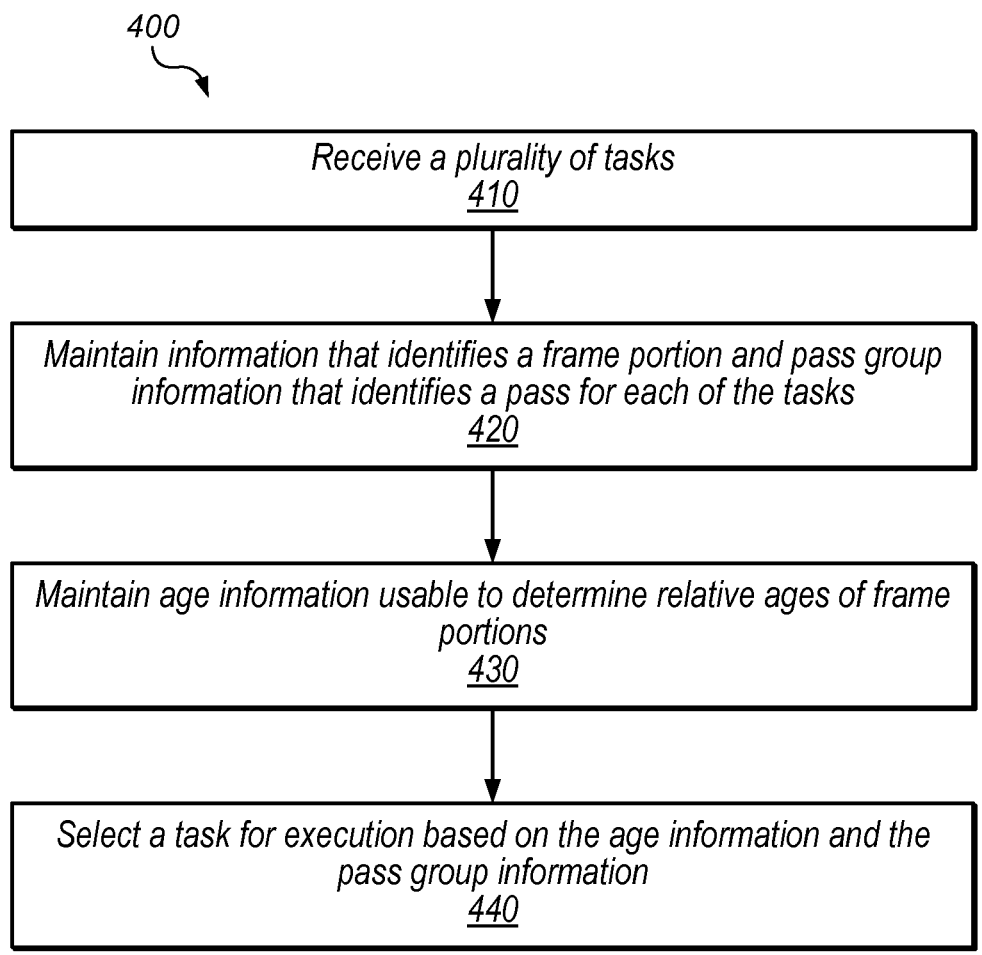
FIG. 4 is a flow diagram illustrating one embodiment of a method for task scheduling.

Referring now to FIG. 4, a flow diagram illustrating one exemplary embodiment of a method 400 for task scheduling is shown. The method shown in FIG. 4 may be used in conjunction with any of the circuits, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, a plurality of tasks are received. For example, task manager 240 is configured to receive tasks from data sequencer 220 in some embodiments. Flow proceeds to block 420.

At block 420, information identifying a frame portion (e.g., a tile that includes the pixels to be processed by the task) and pass group information is maintained for each task. In this embodiment, the pass group information identifies a pass group for each of the tasks. Flow proceeds to block 430.

At block 430, age information is maintained to determine relative ages of frame portions. The relative ages may be determined based on the initial task received for a given frame portion. In one embodiment, the relative ages are maintained using tile age table 260. Flow proceeds to block 440.

At block 440, a task is selected for execution based on the age information and the pass group information. For example, in some embodiments, task manager 240 is configured to select a task from an oldest tile and current pass group if available and ready. In one embodiment, task manager 240 is configured to select a task using the method of FIG. 3. Flow ends at block 440.

Exemplary Device

Figure 5:
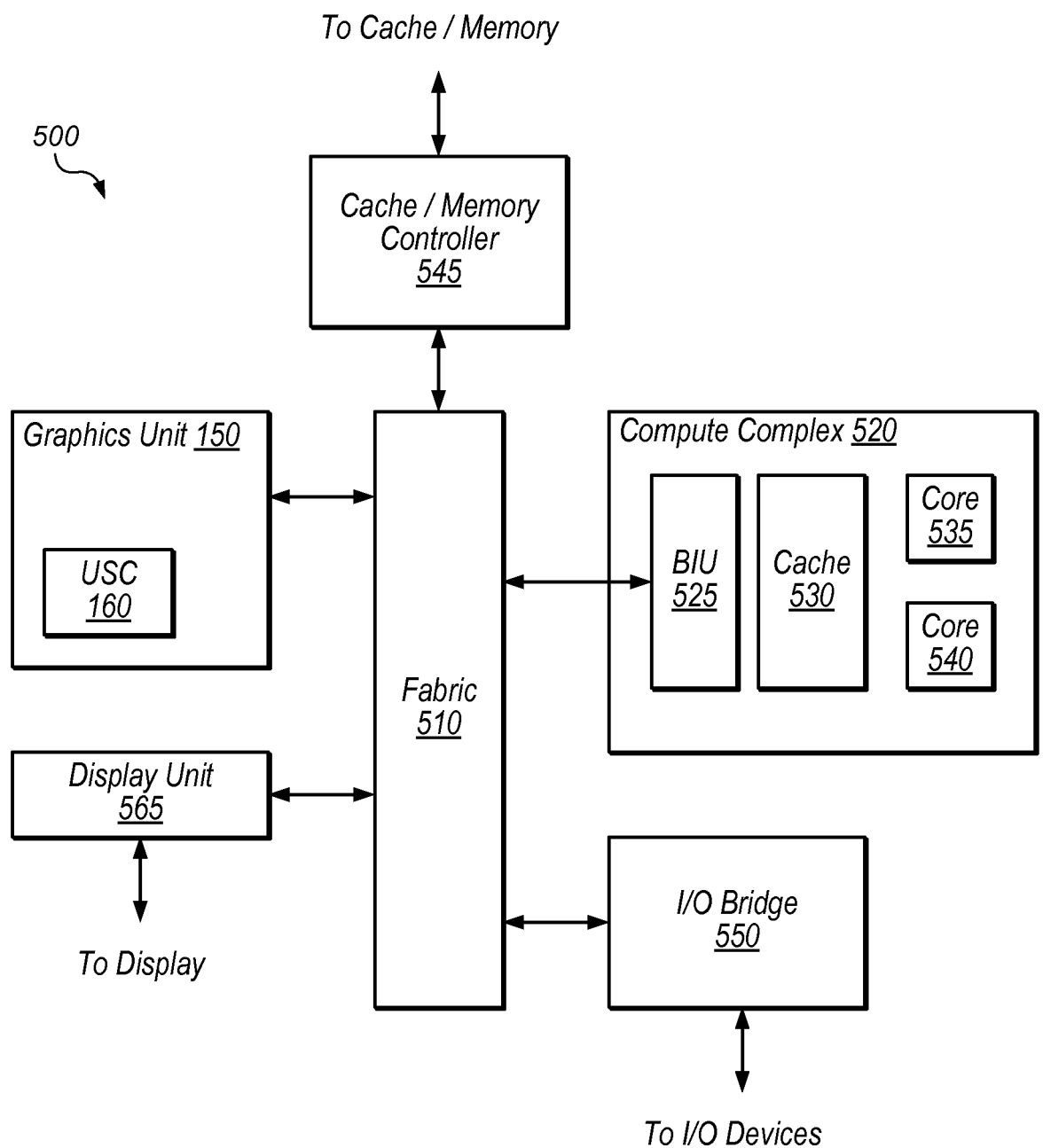
FIG. 5 is a block diagram illustrating one embodiment of a device that includes a graphics unit.

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 150, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may be configured as described above with reference to FIGS. 1-4. Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    graphics circuitry configured to render a frame of graphics data using a plurality of pass groups, wherein the frame includes a plurality of frame portions, wherein each frame portion includes a plurality of pixels that is less than an entirety of pixels of the frame, and wherein the graphics circuitry comprises:
        scheduling circuitry configured to:
            receive a plurality of graphics processing tasks, including an initial task corresponding to each of the plurality of frame portions;
            maintain, for each of the plurality of tasks, information that identifies one of the plurality of frame portions and pass group information that identifies one of the plurality of pass groups;
            maintain age information that indicates an ordering for the plurality of frame portions wherein the ordering is based on when the corresponding initial task for each frame portion was received, such that the age information indicates, for first and second different frame portions of the plurality of frame portions, whether the initial task for the first frame portion was received before the initial task for the second frame portion, wherein the age information is maintained after completion of the initial tasks for the plurality of frame portions;
            select, for execution by the graphics circuitry, a task from among the plurality of tasks based on the age information and the pass group information, wherein the selection selects a first task from a current pass group prior to selecting a second task from a different pass group, wherein the first task corresponds to a frame portion with a younger initial task than a frame portion of the second task; and
            execute the selected task using one or more graphics processing elements.

2. The apparatus of claim 1, wherein the scheduling circuitry is configured to select tasks according to the following greatest-to-least priority order:
    first, tasks associated with an oldest frame portion and a current pass group of the plurality of pass groups;
    second, tasks associated with a second oldest frame portion and the current pass group;
    third, tasks associated with an oldest frame portion and a different pass group than the current pass group; and fourth, tasks associated with a second oldest frame portion and a different pass group than the current pass group.

3. The apparatus of claim 2, wherein the scheduling circuitry is configured to select tasks according to a round-robin among the frame portions if no task is found using the priority order.

4. The apparatus of claim 1,
wherein an age of one of the plurality of frame portions is determined by an age of an oldest task associated with that frame portion; and
wherein the scheduling circuitry is configured to maintain the age information using an age table in which an entry is allocated for a frame portion when a first task is received for that frame portion.

5. The apparatus of claim 1, wherein the scheduling circuitry is configured to schedule all tasks for an oldest frame portion and a current pass group before scheduling other tasks.

6. The apparatus of claim 1, wherein the frame portions are rectangular tiles of pixels.

7. The apparatus of claim 1, further comprising a data sequencer unit configured to receive pixel data from multiple raster pipelines and send the pixel data to the scheduling circuitry.

8. The apparatus of claim 1, wherein the scheduling circuitry is further configured to select a task from among the plurality of tasks based on the information that identifies one of the plurality of frame portions for a task.

9. A method, comprising:
scheduling circuitry receiving a plurality of graphics processing tasks associated with rendering a frame of graphics data using a plurality of pass groups, including an initial task corresponding to each of a plurality of frame portions;
the scheduling circuitry maintaining information indicating a frame portion and a pass group associated with each of the plurality of tasks;
the scheduling circuitry maintaining age information that indicates an ordering for the plurality of frame portions wherein the ordering is based on when the corresponding initial task for each frame portion was received, such that the age information indicates, for first and second different frame portions, whether the initial task for the first frame portion was received before the initial task for the second frame portion, wherein the age information is maintained after completion of the initial tasks for the plurality of frame portions;
the scheduling circuitry selecting a task based on the age information of the frame portions, the pass groups associated with the plurality of tasks, and the frame portions associated with the plurality of tasks, including selecting a first task from a current pass group prior to selecting a second task from a different pass group, wherein the first task corresponds to a frame portion with a younger initial task than a frame portion of the second task; and
one or more graphics processing elements executing the selected task.

10. The method of claim 9, wherein the selecting includes selecting all tasks for an oldest frame portion and a current pass group before selecting other tasks.

11. The method of claim 9, wherein the selecting is performed according to the following greatest-to-least priority order:
first, tasks associated with an oldest frame portion and a current pass group of the plurality of pass groups;
second, tasks associated with a second oldest frame portion and the current pass group;
third, tasks associated with an oldest frame portion and a different pass group than the current pass group; and
fourth, tasks associated with a second oldest frame portion and a different pass group than the current pass group.

12. The method of claim 11, wherein the scheduling circuitry is configured to select tasks according to a round-robin among the frame portions if no task is selected based on the priority order.

13. The method of claim 9, wherein the frame portions are rectangular tiles of pixels.

14. The method of claim 9, wherein the selecting is performed using at most three clock cycles.

15. An apparatus, comprising:
graphics circuitry configured to render a frame of graphics data using a plurality of pass groups, wherein the frame includes a plurality of tiles and wherein each tile includes a plurality of pixels that is less than an entirety of pixels of the frame;
scheduling circuitry configured to:
receive a plurality of graphics processing tasks, including an initial task corresponding to each of the plurality of tiles, wherein each of the plurality of tasks corresponds to one of the plurality of tiles and one of the plurality of pass groups;
maintain age information that indicates an ordering for the plurality of tiles wherein the ordering is based on when the corresponding initial task for each frame portion was received, such that the age information indicates, for first and second different tiles, whether the initial task for the first tile was received before the initial task for the second tile, wherein the age information is maintained after completion of the initial tasks for the plurality of frame portions;
maintain pass group information indicating the one of the plurality of pass groups corresponding to each of the plurality of tasks;
select, for execution by the graphics circuitry, a task from among the plurality of tasks based on the age information and the pass group information, wherein the selection selects a first task from a current pass group prior to selecting a second task from a different pass group, wherein the first task corresponds to a tile with a younger initial task than a tile of the second task; and
execute the selected task using one or more graphics processing elements.

16. The apparatus of claim 15, wherein the scheduling circuitry is configured to schedule all available tasks for an oldest tile and a current pass group before scheduling other tasks.

17. The apparatus of claim 15, wherein the scheduling circuitry is configured to select tasks according to the following greatest-to-least priority order:
first, tasks associated with an oldest tile and a current pass group of the plurality of pass groups;
second, tasks associated with a second oldest tile and the current pass group;
third, tasks associated with an oldest tile and a different pass group than the current pass group; and
fourth, tasks associated with a second oldest tile and a different pass group than the current pass group.

18. The apparatus of claim 15, further comprising:
data sequencer circuitry configured to receive pixel data from multiple raster pipelines, assign the pixel data to tasks, and send the tasks to the scheduling circuitry.

19. The apparatus of claim 15, further comprising:
a plurality of execution units configured to execute a selected task in parallel for different pixels of the selected task.

* * * * *